US008800665B2

(12) United States Patent
Phadke

(10) Patent No.: US 8,800,665 B2
(45) Date of Patent: Aug. 12, 2014

(54) MARINE COMPOSITE RISER FOR STRUCTURAL HEALTH MONITORING USING PIEZOELECTRICITY

(75) Inventor: Ashutosh Chandrashekhar Phadke, Bangalore (IN)

(73) Assignee: Vetco Gray Inc., Houston, TX (US)

( * ) Notice: Subject to any disclaimer, the term of this patent is extended or adjusted under 35 U.S.C. 154(b) by 538 days.

(21) Appl. No.: 12/850,716

(22) Filed: Aug. 5, 2010

(65) Prior Publication Data

US 2012/0031620 A1 Feb. 9, 2012

(51) Int. Cl.
*G01V 1/00* (2006.01)
*E21B 17/01* (2006.01)

(52) U.S. Cl.
USPC ....... 166/367; 166/336; 166/350; 166/250.01

(58) Field of Classification Search
USPC ........ 166/350, 353, 354, 355, 359, 367; 175/7; 701/116, 6, 9; 702/34, 35, 702/41–43; 405/224.2–222.4
See application file for complete search history.

(56) References Cited

U.S. PATENT DOCUMENTS

| | | | | |
|---|---|---|---|---|
| 5,911,158 | A * | 6/1999 | Henderson et al. | 73/583 |
| 6,048,622 | A | 4/2000 | Hagood, IV et al. | |
| 6,612,370 | B1 * | 9/2003 | Jahnsen et al. | 166/367 |
| 7,234,519 | B2 | 6/2007 | Fripp et al. | |
| 2005/0100414 | A1 * | 5/2005 | Salama | 405/224.2 |
| 2007/0027638 | A1 * | 2/2007 | Fernald et al. | 702/25 |
| 2007/0206440 | A1 | 9/2007 | Fripp et al. | |
| 2008/0128138 | A1 | 6/2008 | Radi | |
| 2008/0249720 | A1 | 10/2008 | Salama | |
| 2011/0125417 | A1 * | 5/2011 | Qing et al. | 702/34 |

FOREIGN PATENT DOCUMENTS

WO 2008120008 A1 10/2008

OTHER PUBLICATIONS

Ozden O. Ochoa, Composite Riser Experience and Design Guidance, Oct. 2006.
Jose Emidio Do Nascimento Oliveira, Deformation and damage analysis of composite beams equipped with polyvinylidene fluoride film sensors, 2008.

* cited by examiner

*Primary Examiner* — James Sayre
(74) *Attorney, Agent, or Firm* — Bracewell & Giuliani LLP

(57) ABSTRACT

A structural health monitoring system for a marine composite riser string is provided. Each riser pipe section includes a cylindrical form having an axis and also a carbon epoxy matrix. A sensor is associated with (e.g., embedded in) and substantially circumscribes the riser pipe section. The sensor includes a PolyVinyliDene Fluoride laminate and electrodes (e.g., conductive silver ink coating) so that the sensor generates electricity at the electrodes responsive to mechanical stresses and strains of the riser section, including vibrations. The system can also include a data acquisition system and digital signal analyzer to analyze signals responsive to the generated electricity at the electrodes of sensors and to provide health monitoring and damage detection for the marine riser pipe string, including impact damage and fatigue crack initiation. The system can further include a subsurface energy storage device and a plurality subsurface microelectromechanical devices coupled to the subsurface energy storage device.

19 Claims, 8 Drawing Sheets

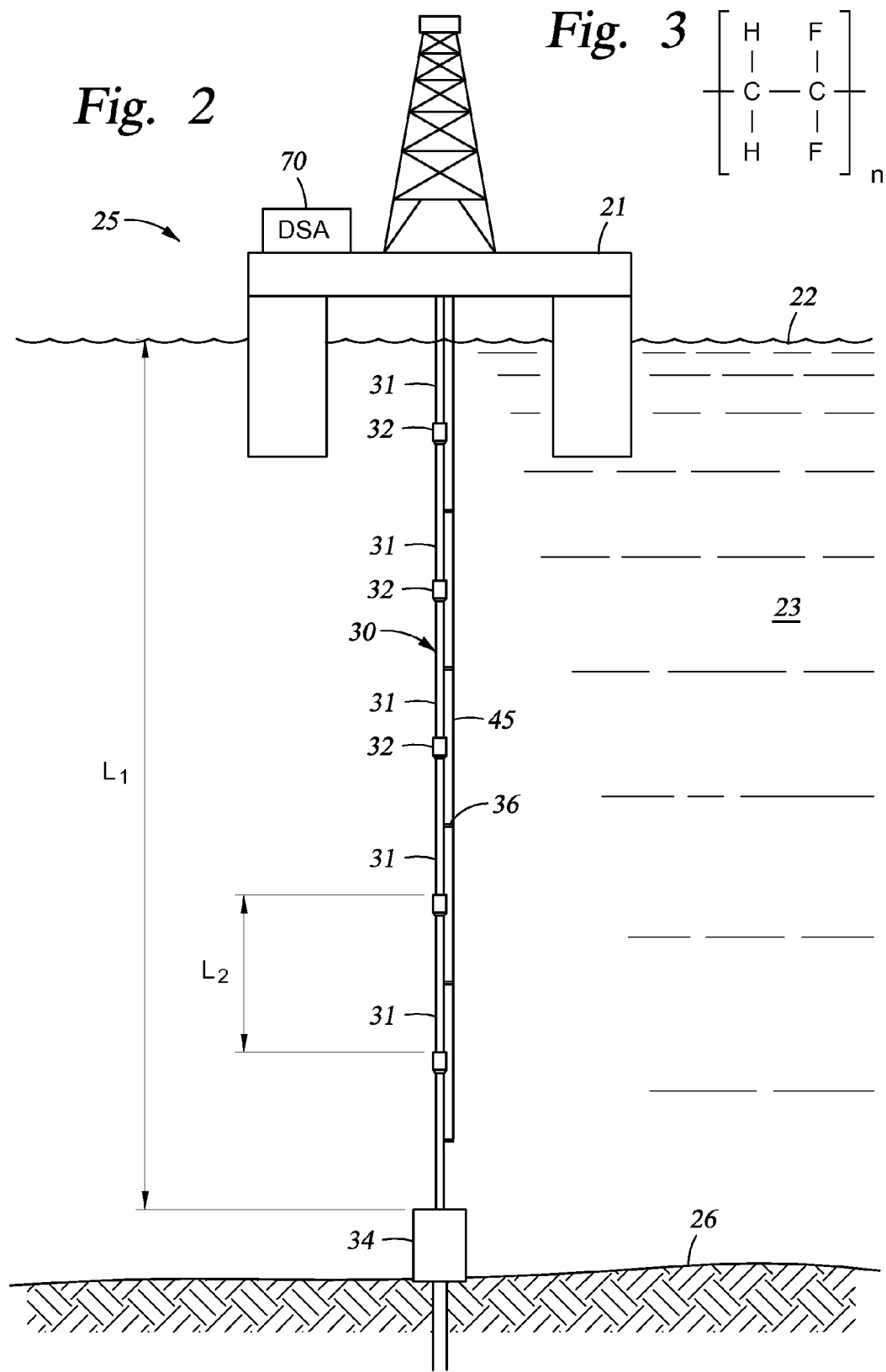

MARINE COMPOSITE RISER FOR STRUCTURAL HEALTH MONITORING USING PIEZOELECTRICITY

BACKGROUND OF THE INVENTION

1. Field of the Invention

The present invention relates to the oil and gas industry. More particularly, the present invention relates to active structural health monitoring of marine composite riser systems in a production phase.

2. Description of Related Art

In the oil and gas industry, a riser is a string of pipe between the surface and sea bottom. Oil and gas riser pipe strings are assembled sequentially and connect a surface ship, rig, or platform to subsea equipment, including, for example, a Christmas tree, blow out preventer (BOP), or lower marine riser package (LMRP), as understood by those skilled in the art.

During a typical field installation at sea, marine riser pipes are individually lifted from the deck of a vessel, connected to each other at the riser spider, and run down. Two riser pipes are joined, or coupled, by means of a mechanical connector. The length between two riser couplings varies typically between 40 to 80 feet depending on the requirements for the riser system.

Riser Lifecycle Management Systems (RLMS) have been described, such as in co-owned U.S. patent application Ser. No. 12/029,376, which is herein incorporated by reference in its entirety. Such riser lifecycle management systems, for example, can provide asset managers a list of all the riser assets allocated to specific vessels and provide a further breakdown of those assets that are currently deployed, are on deck, or are out for maintenance, along with the expected return date; a list of upcoming scheduled maintenance events; an estimate of the amount of operational life being expanded by a particular riser asset; and an estimate of the total amount of operational life used by a particular riser asset, along with the details of the most damaging events (i.e., a certain hurricane event).

Piezoelectricity is the generation of electricity or of electric polarity in dielectric crystals subjected to mechanical strain and stress, or the generation of strain and stress in such crystals subjected to an applied voltage.

Existing structural health monitoring approaches and techniques all have various advantages, disadvantages, and trade-offs.

X-ray radiography, for example, is capable of internal damage and propagation detection, is relatively simple, and can produce a permanent record of results (i.e., an x-ray image). X-ray radiography is, however, expensive to implement, requires expensive equipment, is time-consuming, and requires skills for correct interpretation. As such, x-ray radiography is not fully automated (i.e., human operators are required).

Strain gauges, for example, offer light-weight and low-power operations for structural health monitoring. Strain gauges are portable, can be surface mounted, and provide a relatively simple procedure. Strain gauges are, however, expensive to implement and require expensive equipment.

Optical fibers, for example, are generally a light-weight solution that can cover large areas utilizing inexpensive equipment for structural health monitoring. Optical fibers, however, are expensive to implement, requiring laser in the diagnostic process; optical fibers must be embedded in the structural health monitoring solution.

Ultrasonic structural health monitoring solutions, for example, are portable and sensitive to small damage; they offer a quick scan of a large area. Ultrasonic structural health monitoring solutions, however, utilize very expensive equipment, provide complex results, and require specialized systems for operation.

SUMMARY OF THE INVENTION

In view of the foregoing, Applicant recognizes that structural health monitoring techniques based on piezoelectricity offer portable, light-weight, low-powered, and inexpensive (both the equipment and to implement) solutions that can scan a relatively small or relatively large area quickly. Applicant further recognizes that a marine riser system provides a continuous source of bending and tensile stresses and strains. Typically, a riser is kept in tension using tensioners at the surface to keep the entire structure stable. A riser subjected to compression can buckle, resulting in an unstable riser system. Also, riser movement due to vessel offset or platform shift causes bending stresses and strains along the riser pipe string. Moreover, Applicant recognizes that PolyVinyliDene Fluoride (PVDF) laminates or films can be utilized by marine riser systems for active structural health monitoring of and subsea power generation. PVDF is a semi-crystalline polymer consisting of long chain of molecules with $CH_2$-$CF_2$ as a repeating unit. Specifically, Applicant recognizes that PVDF laminates or films can be embedded in and substantially circumscribe a riser composite pipe, constructing a vibration-based strain sensor, so that electricity is generated at the electrodes of the sensor responsive to mechanical stresses and strains of the marine riser pipe section. Advantageously, such laminate embodiments provide an enhanced ability to detect cracks in the composite riser (and not simply to provide stress and strain detection). Applicant recognizes that substantial amount of power can be generated from bonded or embedded PVDF laminates due to the piezoelectric effect. In addition, Applicant recognizes the need for systems, apparatuses and related methods using piezoelectricity for active structural health monitoring and subsea power generation in a marine riser system, including improved crack detection.

Embodiments of the present invention include, for example, a structural health monitoring system for a riser string. The system can include a marine riser pipe string. The marine riser pipe string can include a plurality of riser pipe sections and a plurality of riser connectors. Each of the plurality of riser pipe sections can include a cylindrical form having an axis, a carbon epoxy matrix, and a sensor. The sensor can include electrodes and a PolyVinyliDene Fluoride (PVDF) laminate substantially circumscribing the riser pipe section, thus providing enhanced riser crack detection over smaller piezoelectric sensors (with a lesser footprint). The sensor can be constructed to generate electricity at the electrodes responsive to mechanical stresses and strains of the riser pipe section. The system can further include a data acquisition system and a digital signal analyzer, e.g., located at the surface, to capture, digitize, and analyze electrical signals responsive to the generated electricity at the electrodes of sensors for the plurality of riser pipe sections and to provide health monitoring for the marine riser pipe string.

The digital signal analyzer embodiments can include, for example, a processor, an input/output device, and a tangible and non-transitory memory having stored therein a computer program product. The computer program product can include a set of instructions that, when executed by the processor, cause the digital signal analyzer to provide health monitoring for the marine riser pipe string by performing various operations. The operations can include receiving, by the input/output device, the electrical signals responsive to the generated electricity at the electrodes of sensors for the plurality of riser pipe sections. The operations can also include analyzing, by the processor, the electrical signal to provide health monitoring for the marine riser pipe string.

Embodiments of the present invention include, for example, a method of detecting a crack in a composite riser. The method includes assembling a marine riser pipe string utilizing a plurality of riser pipe sections. Each of the plurality of riser pipe sections can include a cylindrical form having an axis, and at least one riser pipe section of the plurality of riser pipe sections can include a carbon epoxy matrix. The method can include providing at least one sensor with the at least one riser pipe section, where the sensor substantially circumscribes the riser pipe section. The sensor can include a PolyVinyliDene Fluoride laminate and electrodes. The method can include generating electricity at the electrodes of the sensor responsive to mechanical stresses and strains of the riser pipe section. The method can include analyzing an electrical signal, where the electrical signal is responsive to the generated electricity at the electrodes of the at least one sensor, to thereby detect a crack in the at least one riser pipe section. The method can further include a data acquisition system and a digital signal analyzer.

The method embodiments can further include storing energy from the generated electricity in a subsurface energy storage device, and supplying electricity to subsurface microelectromechanical devices from the subsurface energy storage device.

Embodiments of the present invention include, for example, an apparatus. The apparatus can include, for example, a marine riser pipe section having a cylindrical form and an axis. The marine riser pipe section can include a carbon epoxy matrix. The apparatus can also include a sensor associated with and substantially circumscribing the marine riser pipe section. The sensor can include a PolyVinyliDene Fluoride laminate and electrodes. The sensor can be constructed to generate electricity at the electrodes of the sensor responsive to mechanical stresses and strains of the marine riser pipe section. The apparatus embodiments can further include a thickness of the PolyVinyliDene Fluoride laminate being between about 50 microns to about 250 microns, and the electrodes including a conductive silver ink coating.

Other prior solutions mount sensors on a marine riser in a piecemeal fashion and fail to describe a piezoelectricity sensor substantially circumscribing the riser section or extending along the axis of the riser pipe section for a length greater than 75% of a length of the riser pipe section. Other prior art solutions fail to recognize PVDF embodiments and their applications, including the enhanced crack detection functionality described herein.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 2 is a schematic view of an active structural health monitoring system for a marine riser string according to an embodiment of the present invention.

FIG. 3 is a chemical formula for PolyVinyliDene Fluoride (PVDF) according to an embodiment of the present invention.

DETAILED DESCRIPTION

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art.

The embodiments of the present invention contribute to the usefulness of structural health monitoring of a marine riser systems in preventing oil leaks, spills, and associated effects on the environment. By detecting damage, e.g., cracks due to cyclic stress, riser sections may be replaced or repaired prior to failure or significant damage.

Figure 1:
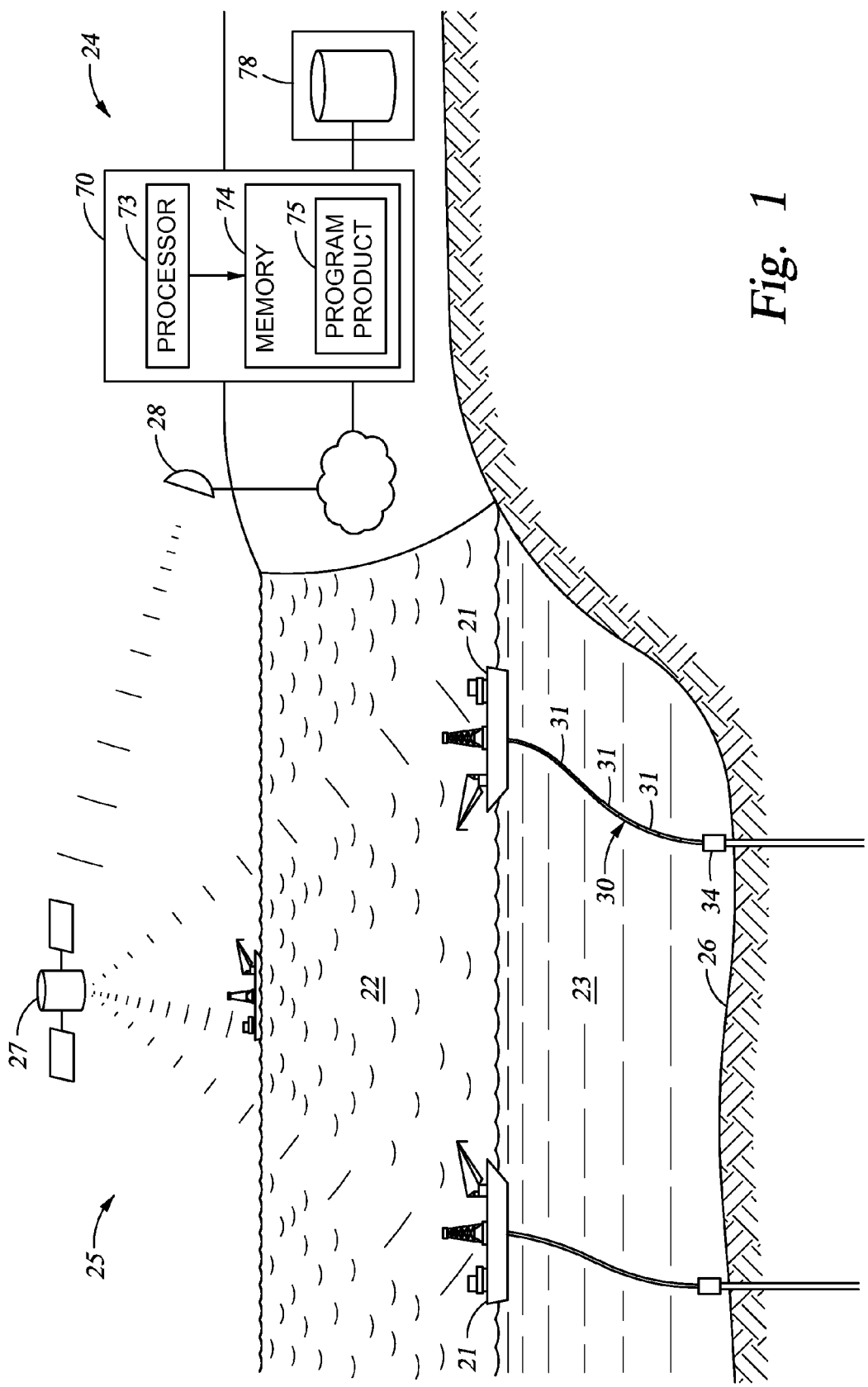
FIG. 1 is an environmental view of an active structural health monitoring system for a marine riser string according to an embodiment of the present invention.

Applicant recognizes that structural health monitoring techniques based on piezoelectricity offer portable, lightweight, self-powered, and inexpensive (both the equipment and to implement) solutions that can scan a relatively small or relatively large area quickly. Applicant further recognizes that a marine riser system, as illustrated in FIG. 1, provides a continuous source of bending and tensile stresses and strains. Typically, a riser is kept in tension using tensioners at the surface to keep the entire structure stable. A riser subjected to compression can buckle, resulting in an unstable riser system. Also, riser movement due to vessel offset or platform shift causes bending stresses and strains along the riser pipe string. Moreover, Applicant recognizes that PolyVinyliDene Fluoride (PVDF) laminates or films can be utilized by marine riser systems for active structural health monitoring of and subsea power generation. Specifically, Applicant recognizes that PVDF laminates or films can be embedded in and substantially circumscribe a riser composite pipe, constructing a vibration-based strain sensor, so that electricity is generated at the electrodes of the sensor responsive to mechanical stresses and strains of the marine riser pipe section. Advantageously, such laminate embodiments provide an enhanced ability to detect cracks in the composite riser (and not simply to provide stress and strain detection). Applicant recognizes that substantial amount of power can be generated from bonded or embedded PVDF laminates due to the piezoelectric effect. In addition, Applicant recognizes the need for systems, apparatuses and related methods using piezoelectricity for active structural health monitoring and subsea power generation in a marine riser system, including improved crack detection.

PVDF is a semi-crystalline polymer consisting of long chains of molecules with $CH_2$-$CF_2$ as a repeating unit, as illustrated in FIG. 3. The molecular weight of PVDF is about 105 corresponding to 2000 repeating units. PVDF can be obtained in crystalline as well as amorphous form. Four crystalline forms are known as I, II, III and p II, and also known as $\beta$, $\alpha$, $\gamma$ and $\alpha$ ($\delta$). PVDF films used as sensors are often uniaxially or biaxially stretched and rolled to improve the mechanical and electrical properties. Commercially available PVDF film is usually the antipolar form II material. In order to make this material piezoelectric it goes through different processes, e.g., stretching, annealing, thermal or corona poling, and evaporation of electrodes, as understood by those skilled in the art. Because fluorine is so much more electronegative than carbon, the fluorine atoms will pull electrons away from the carbon atoms to which they are attached. This means the —$CF_2$— groups in the chain will be very polar with a partial negative charge on the fluorine atoms and with a partial positive charge on the carbon atoms. When placed in an electrical field, the groups align. This causes the polymer to deform with all those —$CF_2$— groups trying to align, producing what is known as polarization. In embodiments of the present invention, PVDF laminate can be embedded in carbon epoxy composite pipe as a vibration-based sensor. PVDF sensor thickness, in a preferred embodiment, can range from 50 to 250 microns in order to have high sensitivity.

As understood by those skilled in the art, piezoelectricity can be described mathematically within a material's constitutive equation, which defines how the piezoelectric material's stress T, strain S, charge-density displacement D, and electric field E interact. The piezoelectric constitutive relationships in the strain-charge form are given by (1) and (2):

$$D = d \cdot T + \in_T \cdot E \quad (1)$$

$$S = s_E \cdot T + d \cdot E \quad (2)$$

PVDF constitutive relationships in stress-charge form are given by (3) and (4):

$$T = c_E \cdot S - e_T \cdot E \quad (3)$$

$$D = e \cdot S + \in \cdot E \quad (4)$$

Where, T is the stress component, S is the strain component and E is the electric field component. In order to measure the electric displacement D or the strain S, both electric field intensity E and the stress T need to be specified. Mechanical and electrical boundary conditions must be specified when defining any physical quantity for PVDF. The relationship between the mechanical and electrical behavior of piezoelectric material is expressed in terms of their piezoelectric coefficients.

According to embodiments of the present invention, PVDF provides significant advantages compared with other piezoelectric materials for structural health monitoring of marine riser strings. For example, PVDF has the highest tensile strength of all processable fluorocarbons and better radiation resistance. As understood by those skilled in the art, PVDF is melt-processable. PVDF lends itself to applications as described herein as PVDF can be metalized and embedded within composite materials. Moreover, PVDF has good abrasion resistance and good general chemical resistance. PVDF has a maximum use temperature 150° C. (300° F.). PVDF provides flexibility and ruggedness; PVDF is light-weight and has relatively low acoustic impedance. Advantageously, since PVDF is available in the form of thin films of large sheets, it is not expensive to produce; it is easy to cut or shape into complex configurations. Beneficially, PVDF can be integrated into existing structures.

Embodiments of the present invention include bonding PVDF sheets to the surface area of pipes (excluding riser coupling) for an entire riser pipe length, or preferably for length $L_3$ greater than 75% of length $L_2$ of the marine riser pipe section 31. See FIG. 4B. Embodiments of the present invention include embedding PVDF sheets into a composite riser assembly.

Moreover, because a total length $L_1$ of the assembled marine riser pipe string 30 can be greater than 1000 feet, as illustrated in FIG. 2, a substantial amount of power generation is possible due to piezoelectric effect. This generated power can be used subsea, avoiding or reducing the demands to transmit power from the surface.

Figure 4A:
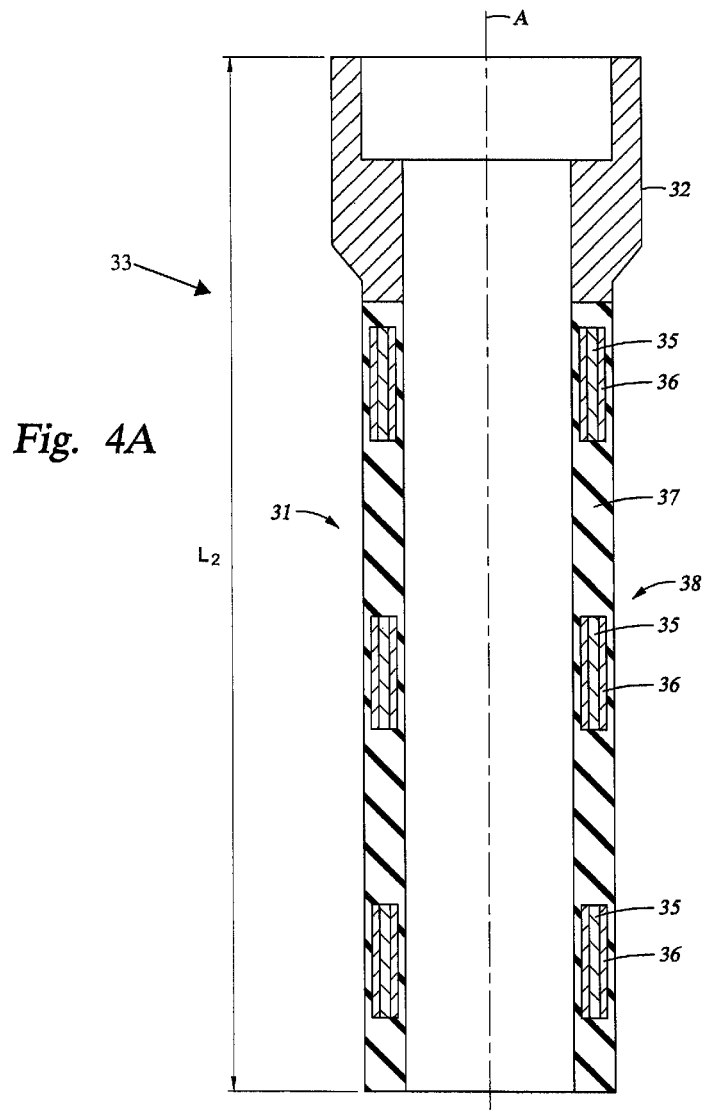
FIGS. 4A, 4B, and 4C are schematic views of apparatus embodiments of the present invention, including riser pipe sections having a cylindrical form and an axis and including one or more sensors associated with and substantially circumscribing the riser pipe section.
Figure 4B:
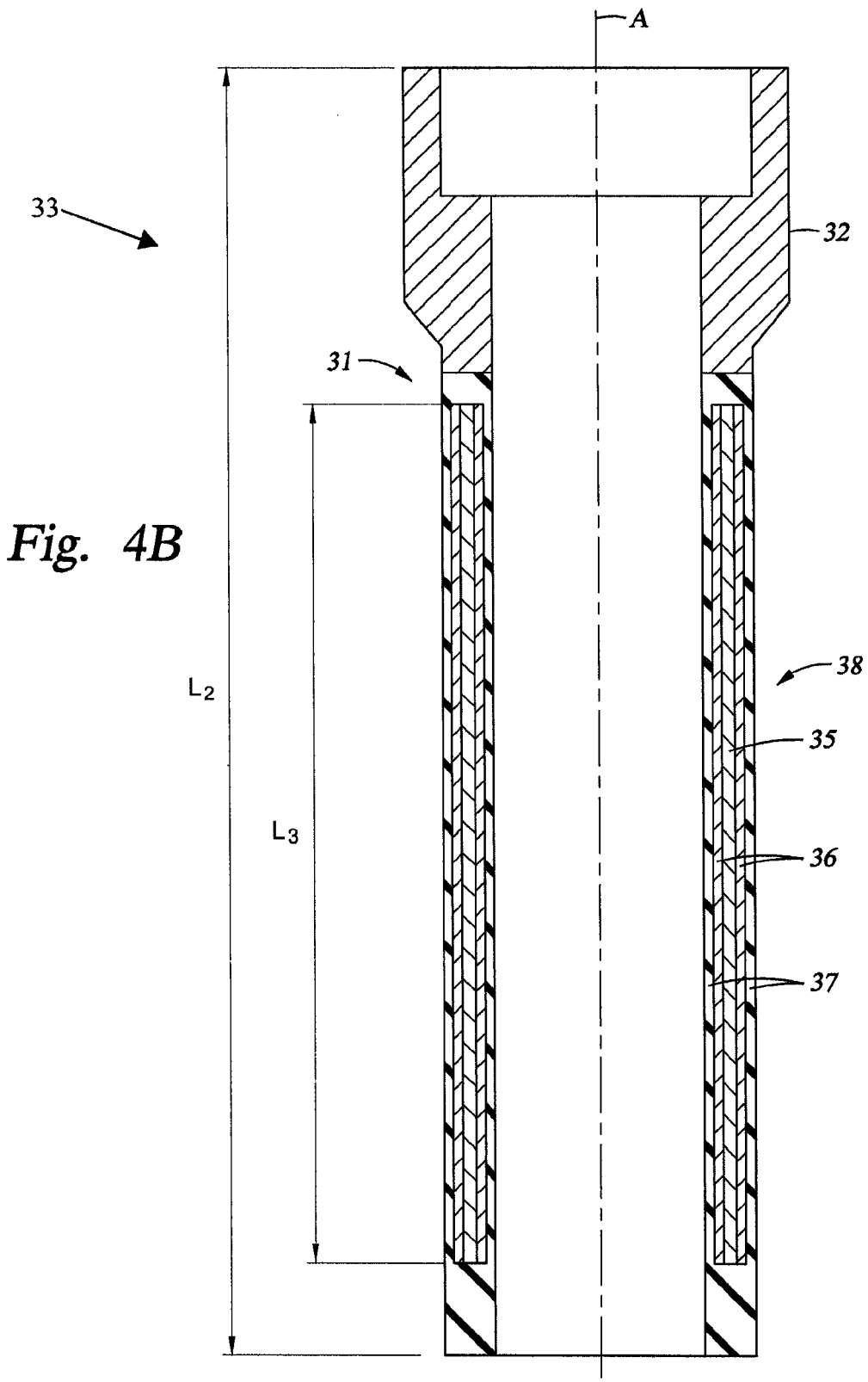

As illustrated in FIGS. 1-2, embodiments of the present invention can include, for example, a system 25 using piezoelectricity for active structural health monitoring and subsea power generation in a marine riser system. As understood by those skilled in the art, a riser is a string of pipe 30 between the surface 22 extending below the surface 23 to the sea bottom 26. Adjacent riser pipes sections 31 are joined, or coupled, by means of a mechanical connector 32. As understood by those skilled in the art, the connector 32 can be separate from the riser section 31 or an integral member of the riser section 31, as illustrated in FIGS. 4A and 4B. Oil and gas riser pipe strings 30 are assembled sequentially and connect a surface ship, rig, or platform 21 to subsea equipment 34, including, for example, a Christmas tree, blow out preventer (BOP), or lower marine riser package (LMRP), as understood by those skilled in the art. The length $L_2$ between two riser couplings varies typically between 40 to 80 feet depending on the requirements for the riser system. See FIGS. 4A and 4B. A total length $L_1$ of the assembled marine riser pipe string 30 can be greater than 1000 feet.

As further illustrated in FIGS. 1-2, a structural health monitoring system 25 for a riser string 30 can include a transmission line 45 connecting individual riser pipe sections 31, particularly including associated sensors 38 at the electrodes 36, with the surface, particularly a digital signal processor 70. Typically the digital signal processor 70 will be located on the surface ship, rig, or platform 21. A system 25 can also include a satellite 27 and associated transmitters/receivers 28 to provide for a remote land-based location 24 for a digital signal processor 70. See also FIG. 7. As understood by those skilled in the art, radio frequency (RF) transmission schemes and other known communication approaches, such as communication over power lines, are within the scope of the embodiments of the present invention.

As illustrated in FIG. 3, PVDF is a semi-crystalline polymer consisting of long chains of molecules with $CH_2$-$CF_2$ as a repeating unit.

Figure 4C:
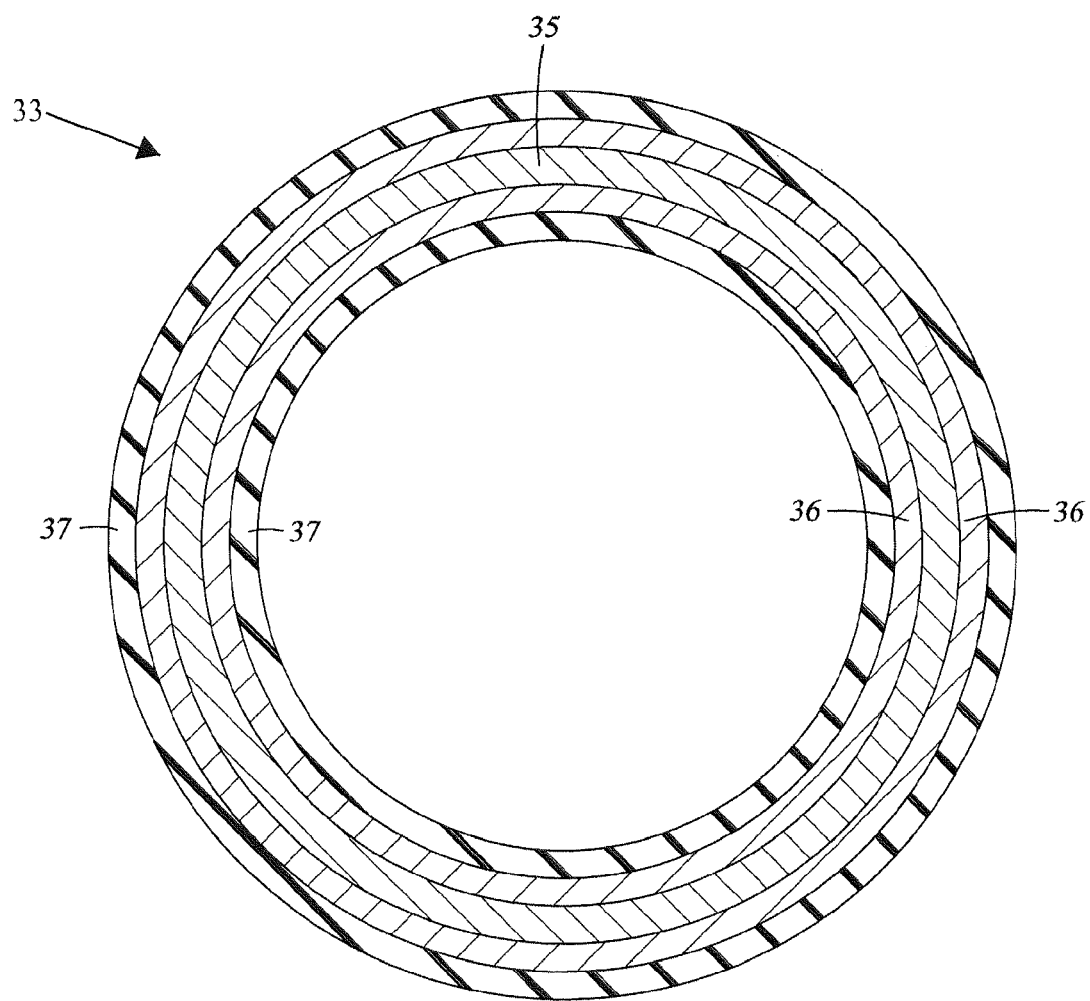

As illustrated in FIGS. 4A, 4B, and 4C, embodiments of the present invention include, for example, an apparatus. The apparatus can include, for example, a marine riser pipe section 31. The marine riser pipe section 31 can comprise have a cylindrical form 33. The marine riser pipe section 31 can have an axis A. The marine riser pipe section 31 can include a carbon epoxy matrix 37. The apparatus can also include, for example, a sensor 38 associated with and substantially circumscribing the marine riser pipe section 31. The sensor 38 can include a PolyVinyliDene Fluoride laminate 35, e.g., having a thickness of between about 50 microns to about 250 microns, and electrodes 36, e.g., a conductive silver ink coating. The sensor 38 can be constructed to generate electricity at the electrodes 36 of the sensor 38 responsive to mechanical stresses and strains (e.g., due to vibration) of the marine riser pipe section 31. For example, the sensor 38 can be embedded between layers of the carbon epoxy matrix 37 of the marine riser pipe 31.

As further illustrated in FIG. 4B, the sensor 38 can extend along the axis A of the marine riser pipe section 31 for length $L_3$ greater than 75% of length $L_2$ of the marine riser pipe section 31. Alternately, as also illustrated in FIG. 4A, multiple sensors 38 can be substantially evenly spaced along the axis A of the marine riser pipe section 31.

Figure 5:
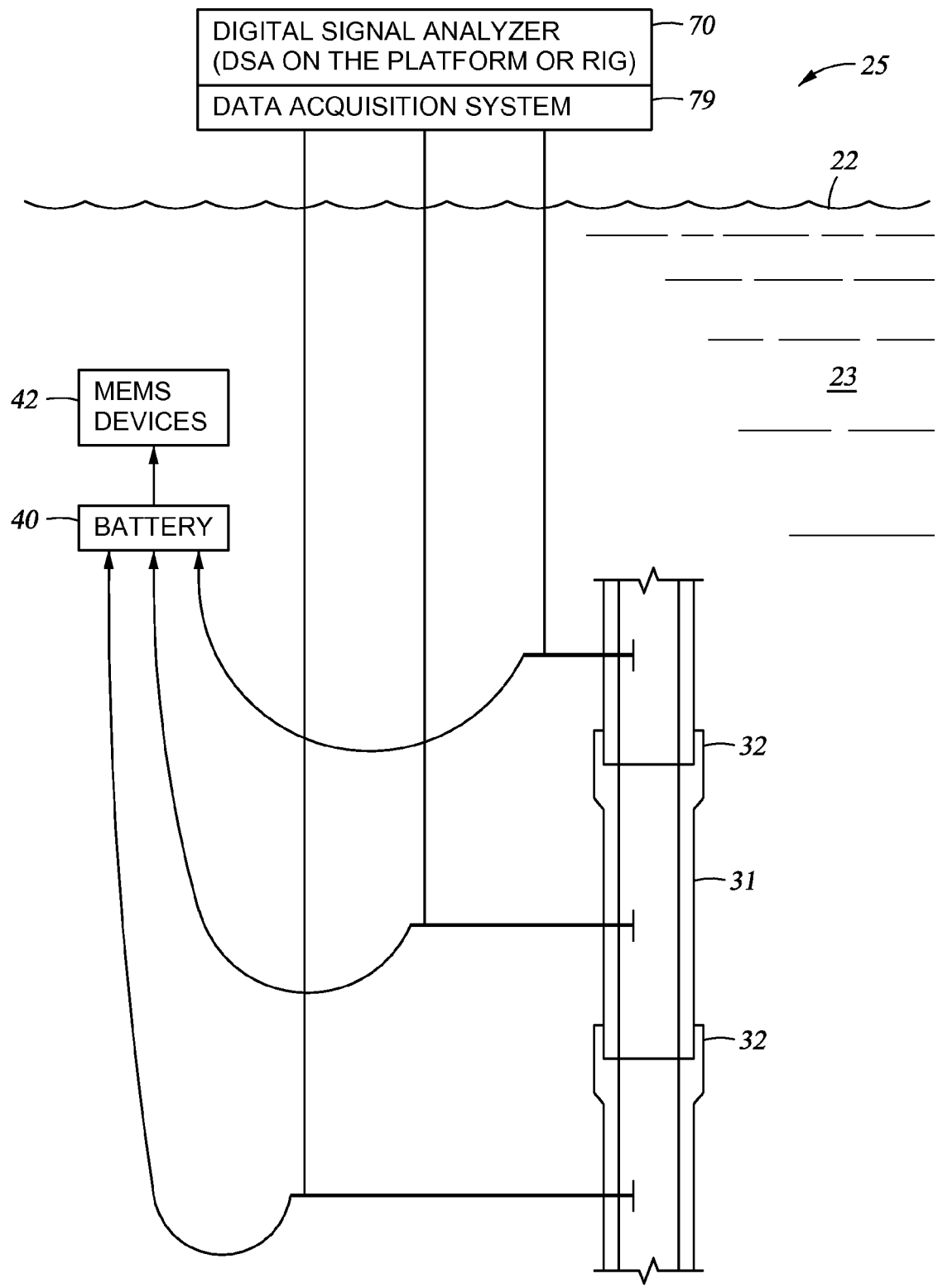
FIG. 5 is a schematic view of an active structural health monitoring system for a marine riser string according to an embodiment of the present invention.

As illustrated in FIG. 5, embodiments of the present invention include, for example, a structural health monitoring system 25 for a riser string 30. The system 25 can include, for example, a marine riser pipe string 30. The riser string 30 can include a plurality of riser pipe sections 31 and a plurality of riser connectors 32. A riser pipe section 31 can include a cylindrical form, an axis, a carbon epoxy matrix, and a sensor, comprising electrodes and a PolyVinyliDene Fluoride laminate substantially circumscribing the riser pipe section. See FIG. 4C. The system 25 can include, for example, a digital signal analyzer 70 and a data acquisition system 79, perhaps located at the surface 22, to capture, digitize, and analyze electrical signals responsive to the generated electricity at the electrodes of sensors for the plurality of riser pipe sections and to provide health monitoring for the marine riser pipe string. See also FIG. 7.

In a preferred embodiment, from each riser section, at least one signal is acquired using data acquisition system through multiple channels on a data acquisition system (DAQ) board. Signal boosting stations may also be included along the transmission line. The output signals from the DAQ board are inputs to the digital signal analyzer, which can filter and analyze the signals for any damage detection. As understood by those skilled in the art, the digital signal analyzer typically use Fast Fourier Transform (FFT) to get the transfer function (Input/Output) to monitor the first few modes of natural frequency. Alternately, other frequency analysis techniques may be used. If there is any damage, the natural frequency of the structure shifts and damage can be detected. For example, 40 signals from 40 different riser sections may be monitored through different input/output channels on a data acquisition system (DAQ) board. A significant or major shift in natural frequency from any particular riser section, e.g., the 5th from the top, will indicate damage in that section, i.e., the 5th riser section.

The system 25 can further include, for example, a subsurface energy storage device 40 to store energy from the generated electricity. The system 25 can include, for example, a plurality subsurface microelectromechanical devices 42 coupled to the subsurface energy storage device 40. The subsurface microelectromechanical devices 42, for example, can be part of the subsea equipment 34, including, for example, a Christmas tree, blow out preventer (BOP), or lower marine riser package (LMRP).

Figure 6:
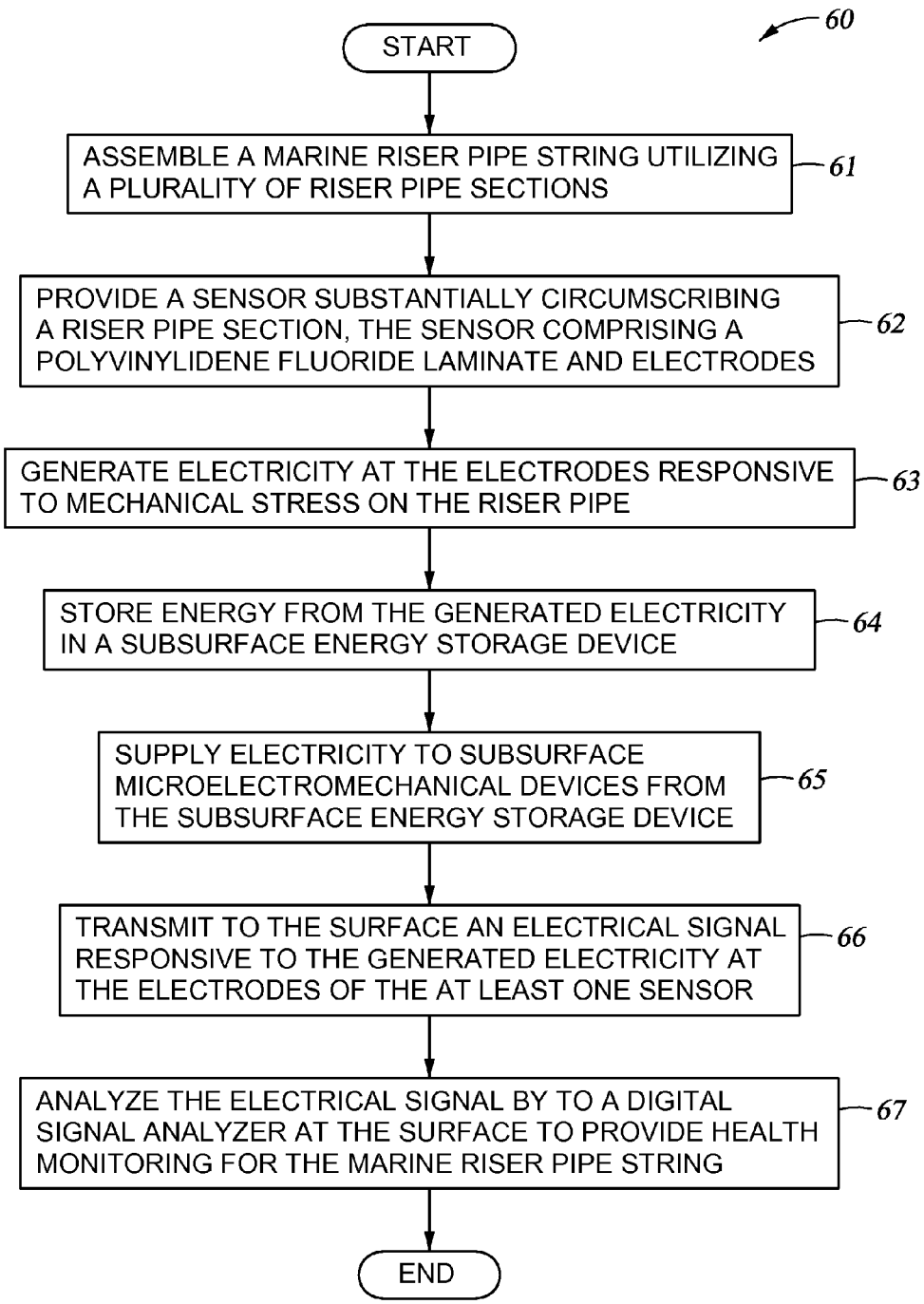
FIG. 6 is a schematic block diagram of method of providing active structural health monitoring of marine composite riser systems, e.g., detecting a crack in a composite riser, according to an embodiment of the present invention.

As illustrated in FIG. 6, embodiments of the present invention include, for example, a method 60 of providing active structural health monitoring of marine composite riser systems, e.g., detecting a crack in a composite riser. The method 60 can include, for example, assembling a marine riser pipe string 30 (e.g., having a total length $L_1$ of the assembled marine riser pipe string 30 being greater than 1000 feet) utilizing a plurality of riser pipe sections 31, as shown at 61. Each of the plurality of riser pipe sections 31 can include a cylindrical form 33 having an axis A. At least one riser pipe section of the plurality of riser pipe sections 31 can include a carbon epoxy matrix 37. The method 60 can include, for example, providing at least one sensor 38 with the at least one riser pipe section, as shown at 62. The at least one sensor 38 can substantially circumscribe the at least one riser pipe section 31. The at least one sensor 38 can include a PolyVinyliDene Fluoride laminate 35, e.g., having a thickness of between about 50 microns to about 250 microns. The at least one sensor 38 can include electrodes 36, e.g., a conductive silver ink coating. The method 60 can include, for example, generating electricity at the electrodes 36 of the at least one sensor 38 responsive to mechanical stresses and strains (e.g., due to vibration) of the at least one riser pipe section 31, as shown at 63.

The method 60 can also include, for example, transmitting to the surface 22 an electrical signal responsive to the generated electricity at the electrodes 36 of the at least one sensor 38, as shown at 66. As understood by those skilled in the art, transmission can utilized a transmission line 45, as illustrated in FIG. 2, or a radio frequency (RF) transmission scheme. The method 60 can include, for example, analyzing the electrical signal by to a digital signal analyzer 70 at the surface 22 to provide health monitoring for the marine riser pipe string 30, as shown at 67. Health monitoring can include, for example, damage detection, such as, impact damage and fatigue crack initiation as understood by those skilled in the art.

The method 60 can further include, for example, storing energy from the generated electricity in a subsurface energy storage device 40, as shown at 64. The method 60 can include, for example, supplying electricity to subsurface microelectromechanical devices 42 from the subsurface energy storage device 40, as shown at 65.

Figure 7:
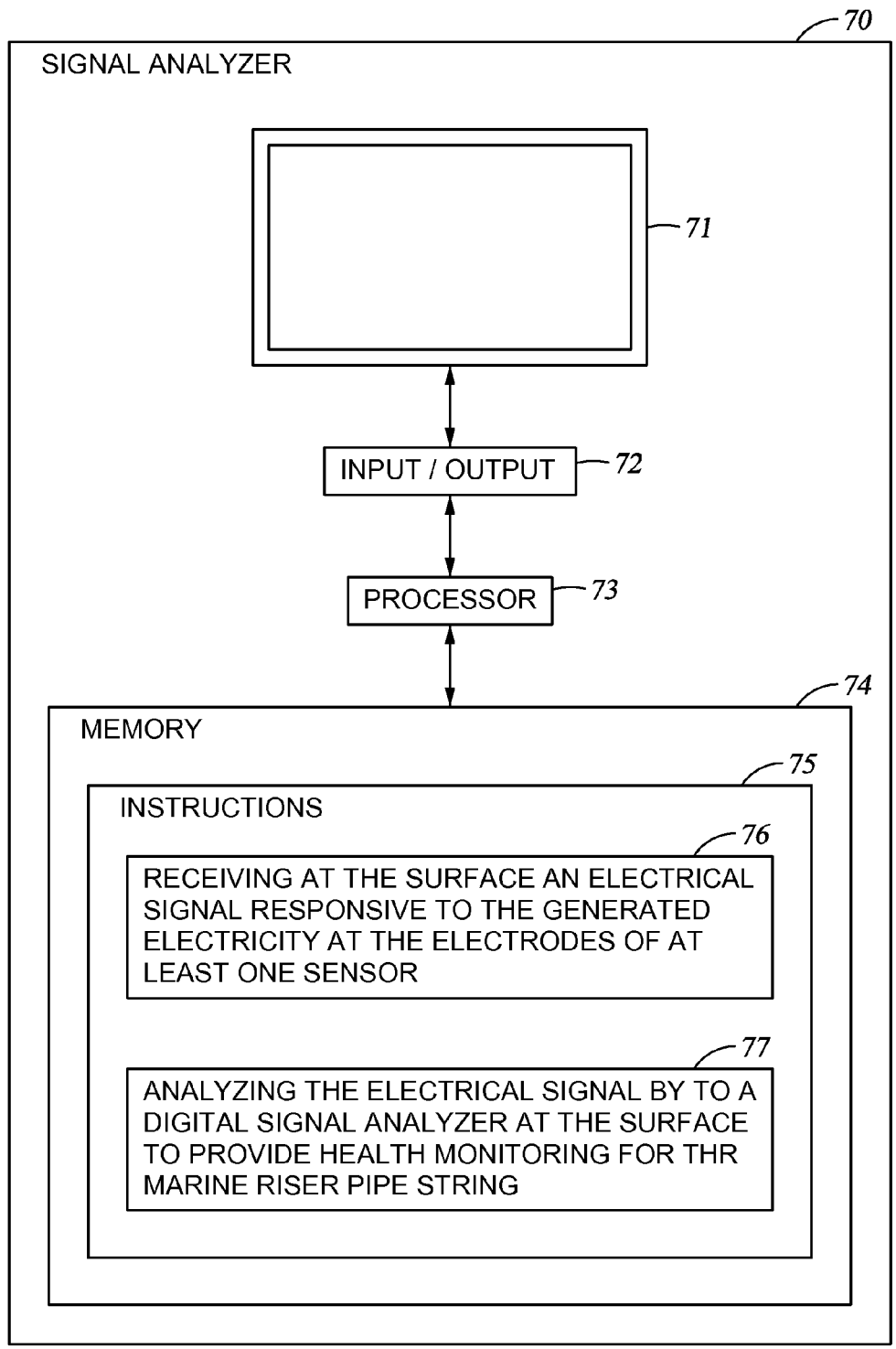
FIG. 7 is a schematic block diagram of a signal analyzer according to an embodiment of the present invention.

As illustrated in FIG. 7, embodiments of a structural health monitoring system 25 for a riser string can include a digital signal analyzer 70. The digital signal analyzer 70 can be located at or on the surface 22, typically on the surface ship, rig, or platform 21 and alternately at a land-based location 24 (as illustrated in FIG. 1). The digital signal analyzer 70 can include, for example, a processor 73 positioned to analyze electrical signals. The digital signal analyzer 70 can include, for example, an input/output device 72 for receiving the electrical signals responsive to the generated electricity at the electrodes of sensors for the plurality of riser pipe sections. The digital signal analyzer 70 can include, for example, a display 71. The digital signal analyzer 70 can include, for example, a memory 74 having stored therein a computer program product 75. The computer program product 75 is stored on a tangible and non-transitory computer memory media 74, is operable on the processor 73, and includes a set of instructions that, when executed by the processor 73, cause the digital signal analyzer 70 to provide health monitoring for the marine riser pipe string by performing various operations. The operations can include receiving, by the input/output device 72, an electrical signal responsive to the generated electricity at the electrodes of sensors for the plurality of riser pipe sections 31, as shown at 76. The operations can include analyzing, by the processor 73, the electrical signal to provide health monitoring for the marine riser pipe string 30, as shown at 77. As understood by those skilled in the art, such analysis can generally include multiphysics modeling and simulation techniques to model the piezoelectric effects from the riser string 30 being subjected to bending and tension. Multiphysics modeling includes simulations in which there is an interaction with different fields, such as, mechanical, electrical, and magnetic. In Piezoelectric analysis, structural and electrical fields are coupled using constitutive stress-charge and strain-charge material properties; this is called direct coupling. Alternately, sequential coupling involves, for example, the output of a structural analysis being input into an electric analysis.

As further illustrated in FIG. 1, the digital signal analyzer 70 can also include or access one or more databases 78 stored on internal or external memory.

A person having ordinary skill in the art will recognize that various types of memory are readable by a computer such as described herein, e.g., the digital signal analyzer, or other computers with embodiments of the present invention. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions, as well as instructions related to the system and the method steps described above and can operate on a computer. It will be understood by those skilled in the art that such media can be at other locations instead of or in addition to the locations described to store program products, e.g., including software, thereon. Each of these computer or servers, for example, can having one or more of these various types of memory as understood by those skilled in the art.

A person having ordinary skill in the art will further recognize that various types of software languages and development environments can be used to implement the embodiments described herein, including C++, Visual Basic, Fortran, Java, HTML, and other programming languages.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification.

The invention claimed is:

1. An apparatus comprising:
 a marine riser pipe section comprising a cylindrical form having an axis, the cylindrical form having an inner and an outer layer of a carbon epoxy matrix;
 a sensor associated with and circumscribing the marine riser pipe section, the sensor comprising a PolyVinyliDene Fluoride laminate sheet having upper and lower edges, each of the upper and lower edges being in a plane perpendicular to the axis, the sheet having an inner side and an outer side with an electrically conductive coating, defining an electrode on the inner side and an electrode on the outer side, the sensor constructed to generate electricity at the electrodes of the sensor responsive to mechanical stresses and strains of the marine riser pipe section; and
 wherein the sensor encircles the inner layer and is embedded between the inner and outer layers of the carbon epoxy matrix of the marine riser pipe.

2. An apparatus of claim 1, wherein the sensor has an axial dimension between the lower edge and the upper edge that is greater than 75% of a length of the marine riser pipe section.

3. An apparatus of claim 1, wherein the sensor is a first sensor, wherein the apparatus further comprises one or more second sensors axially spaced apart from each other along a length of the marine riser pipe section.

4. An apparatus of claim 3, wherein the first sensor and the one or more second sensors are substantially evenly spaced apart from each other along the axis of the marine riser pipe section.

5. An apparatus of claim 1, wherein:
 a thickness of the PolyVinyliDene Fluoride laminate is between about 50 microns to about 250 microns; and
 the conductive coating comprises silver ink.

6. An apparatus of claim 1, wherein the coatings on the inner and the outer sides of the sensor are coextensive with the sheet, defining a single one of the electrodes on the inner side and a single one of the electrodes on the outer side.

7. A structural health monitoring system for a riser string, the system comprising:
 a marine riser pipe string comprising a plurality of riser pipe sections, each of the plurality of riser pipe sections comprising:
 a cylindrical form having an axis, the cylindrical form having an inner layer and an outer layer of a carbon epoxy matrix; and
 a cylindrical laminate sensor sheet of a PolyVinyliDene Fluoride material circumscribing the riser pipe section, the sheet having an electrically conductive coating on an inner side and on an outer side, defining an inner electrode and an outer electrode, the sheet constructed to generate electricity at the electrodes responsive to mechanical stresses and strains of the riser pipe section, wherein the sheet surrounds the inner layer and is embedded between the inner and outer layers of the carbon epoxy matrix of the riser pipe section; and
 a digital signal analyzer to analyze electrical signals responsive to the generated electricity at the electrodes of sensors for the plurality of riser pipe sections and to provide health monitoring for the marine riser pipe string.

8. A structural health monitoring system of claim 7, wherein the inner electrode is an only electrode on the inner side of the sheet, and the outer electrode is an only electrode on the outer side of the sheet.

9. A structural health monitoring system of claim 7, the system further comprising a data acquisition system; and wherein the digital signal analyzer is adapted to be located on a drilling vessel.

10. A structural health monitoring system of claim 7, the system further comprising
 a subsurface energy storage device to store energy from the generated electricity; and
 a plurality of subsurface microelectromechanical devices coupled to the subsurface energy storage device.

11. A structural health monitoring system of claim 7, wherein the sheet has an upper edge and a lower edge, each of the edges being in a plane perpendicular to the axis, and wherein an xial distance from the upper edge to the lower edge is greater than 75% of a length of the riser pipe section.

12. A structural health monitoring system of claim 7, wherein the digital signal analyzer comprises:
 a processor positioned to analyze electrical signals;
 an input/output device for receiving the electrical signals responsive to the generated electricity at the electrodes of the sensor sheets; and
 a memory having stored therein a computer program product, stored on a tangible and non-transitory computer memory media, operable on the processor, the computer program product comprising a set of instructions that, when executed by the processor, cause the digital signal analyzer to provide health monitoring for the marine riser pipe string by performing the operations of:

receiving, by the input/output device, the electrical signals responsive to the generated electricity at the electrodes of the sensor sheets, and analyzing, by the processor, the electrical signal to provide health monitoring for the marine riser pipe string, the health monitoring including damage detection.

13. A structural health monitoring system of claim 7, wherein:

a thickness of the sensor sheet is between about 50 microns to about 250 microns; and the electrically conductive coating comprises silver ink.

14. A method of detecting a crack in a composite riser, the method comprising:

assembling a marine riser pipe string utilizing a plurality of riser pipe sections, each of the plurality of riser pipe sections comprising a cylindrical form having an axis, at least one riser pipe section of the plurality of riser pipe sections comprising inner and outer layers of carbon epoxy matrix;

providing at least one cylindrical sheet with the at least one riser pipe section, the at least one sensor sheet circumscribing the at least one riser pipe section, the at least one sensor sheet comprising a PolyVinyliDene Fluoride laminate, wherein the at least one sensor is encircles the inner layer and is embedded between the inner and outer layers of the carbon epoxy matrix of the riser pipe section;

an electrically conductive coating on an inner side of the sheet, and an electrically conductive coating on an outer side of the sheet, defining inner and outer electrodes;

generating electricity at the electrodes of the at least one sensor sheet responsive to mechanical stresses and strains of the at least one riser pipe section; and analyzing an electrical signal, the electrical signal responsive to the generated electricity at the electrodes of the at least one sensor sheet, to thereby detect a crack in the at least one riser pipe section.

15. A method of claim 14, wherein a thickness of the PolyVinyliDene Fluoride laminate is between about 50 microns to about 250 microns.

16. A method of claim 14, wherein:

the at least one sensor sheet has an upper edge and a lower edge, each of the edges being in a plane perpendicular to the axis; and an axial distance from the upper edge to the lower edge of the at least one sensor sheet is greater than 75% of a length of the riser pipe section.

17. A method of claim 14, wherein the step of analyzing an electrical signal includes employing a data acquisition system and a digital signal analyzer.

18. A method of claim 14, further comprising:

storing energy from the generated electricity in a subsurface energy storage device; and supplying electricity to subsurface microelectromechanical devices from the subsurface energy storage device.

19. A method of claim 14, wherein the at least one sensor sheet is a first sensor sheet; and wherein the first sensor sheet and one or more second sensor sheets are substantially evenly spaced along the axis of the riser pipe section.

* * * * *